Figure 1:
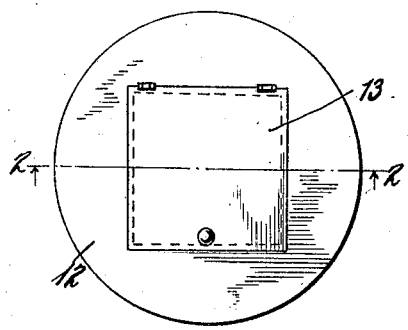

Nov. 10, 1925.

A. H. KNIPKER 1,561,171

INSECT TRAP

Filed Sept. 9, 1922

Inventor

Anna Helen Knipker

By

Attorney

Patented Nov. 10, 1925.

1,561,171

UNITED STATES PATENT OFFICE.

ANNA HELEN KNIPKER, OF CLARKSBURG, MISSOURI.

INSECT TRAP.

Application filed September 9, 1922. Serial No. 587,239.

*To all whom it may concern:*

Be it known that ANNA HELEN KNIPKER, a citizen of the United States, residing at Clarksburg, in the county of Cooper and State of Missouri, has invented certain new and useful Improvements in Insect Traps, of which the following is a specification.

This invention has reference to an insect-trap which is especially adapted to the trapping of flies and other winged insects.

An essential object of the invention is to provide a trap of improved construction in which the flies and other insects are enticed and prevented from escaping; the trap being of a light and portable nature whereby it is capable of being set at any convenient and suitable location.

Various other objects and advantages of the invention will become apparent from the following description of the invention.

Figure 3:
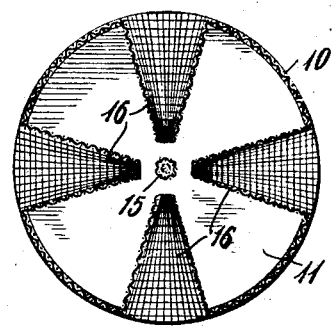
Figure 2:
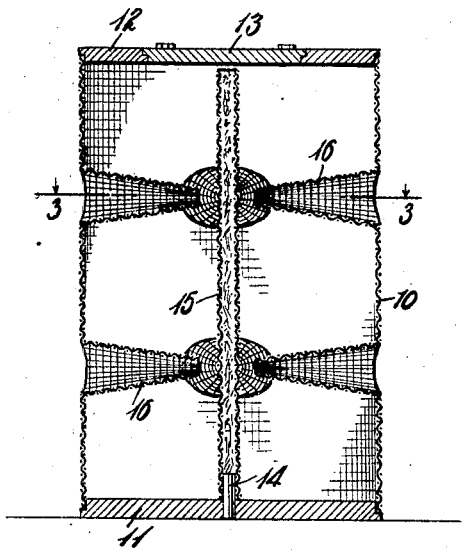

In the drawing:

Figure 1 is a top plan view of the proposed trap, showing the door or outlet thereof, Figure 2 a vertical cross section of the trap as taken on line 2—2 of Figure 1, and Figure 3 a horizontal cross section thereof as taken on line 3—3 of Figure 2.

The trap is constructed preferably of screen mesh formed into a vertical cylinder or roll 10 mounted on a wooden or other suitable base 11 and having the top provided with a hinged door which swings outwardly. The center of the base is provided with a short upstanding lug or pin 14. This pin supports the bait holder 15 which may be a tube of screening as illustrated in the drawing. The upper open end of the screen tube is directly underneath door 13 and is uncovered by the opening of the latter, thus allowing the bait to be readily inserted in the holder. Extending inwardly from spaced points in the circumference of cylinder 10 are a plurality of funnels 16 which provide entrances thru which the flies or other insects gain access to the interior of the trap. These funnels are arranged in vertically spaced series, the units of which are disposed radially about the central bait-holder 15, the inner or smaller ends of the funnels being spaced slightly from the holder so that the flies must enter the trap in order to reach the bait. The diameters of the small openings are such as to provide sufficient room for the flies to pass thru and enter the trap although small enough to discourage any attempts on the part of the flies to crawl back therethru after having passed inside of the cylinder.

It will thus be seen that the invention provides a light, portable, fly-trap which may be conveniently transported from place to place and set at any desired location. The provision of a door in the top of the trap facilitates the cleaning of the latter when required and also enables the contents of the bait-holder to be replenished from time to time.

From the foregoing it is believed that the advantages and novel features of the invention can be readily understood that further detailed description is unnecessary.

What is claimed is:

1. An insect trap comprising a base provided with a centrally disposed vertically extending pin, an outer tubular screen secured at its lower end to the peripheral portion of the base, a top secured to and closing the upper end of the screen and provided with an opening giving access to the interior of the screen, a door hinged to the top for closing said opening, an inner tubular screen arranged with its lower end resting on the base and telescoping said pin and its upper end positioned to be engaged and closed by said door, said inner tubular screen being of considerably smaller diameter than the said opening in the said top so as to readily pass therethrough when being engaged or disengaged with the said pin and a series of conical screens extending horizontally between the outer and inner tubular screens, each of said conical screens having its larger end secured about an entrance opening formed in the outer screen and its smaller end closely approaching the inner screen but spaced therefrom.

2. An insect trap comprising a cylinder formed of a rolled sheet of wire screen and having a plurality of entrances, a pair of rigid discs peripherally secured to the opposite ends of the said cylinder, and a longitudinally disposed bait holder centered within the said cylinder and consisting of a long narrow tube of screening, one of said discs having an inwardly projecting pin adapted to enter one end of the said tube for supporting the latter in position and the other disc having an opening through which the said tube is adapted to be passed into and out of the said cylinder for engaging and disengaging the said pin.

In testimony whereof I affix my signature.

ANNA HELEN KNIPKER.